UNITED STATES PATENT OFFICE.

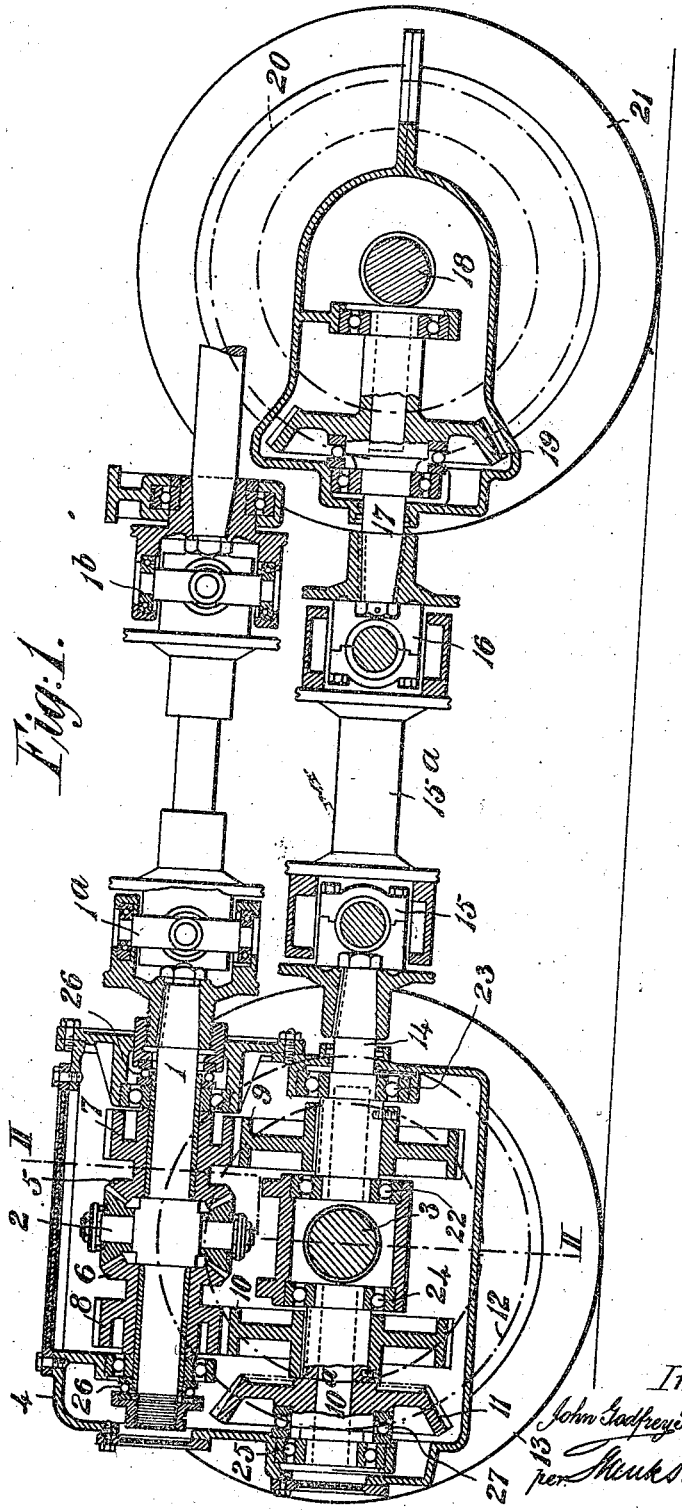

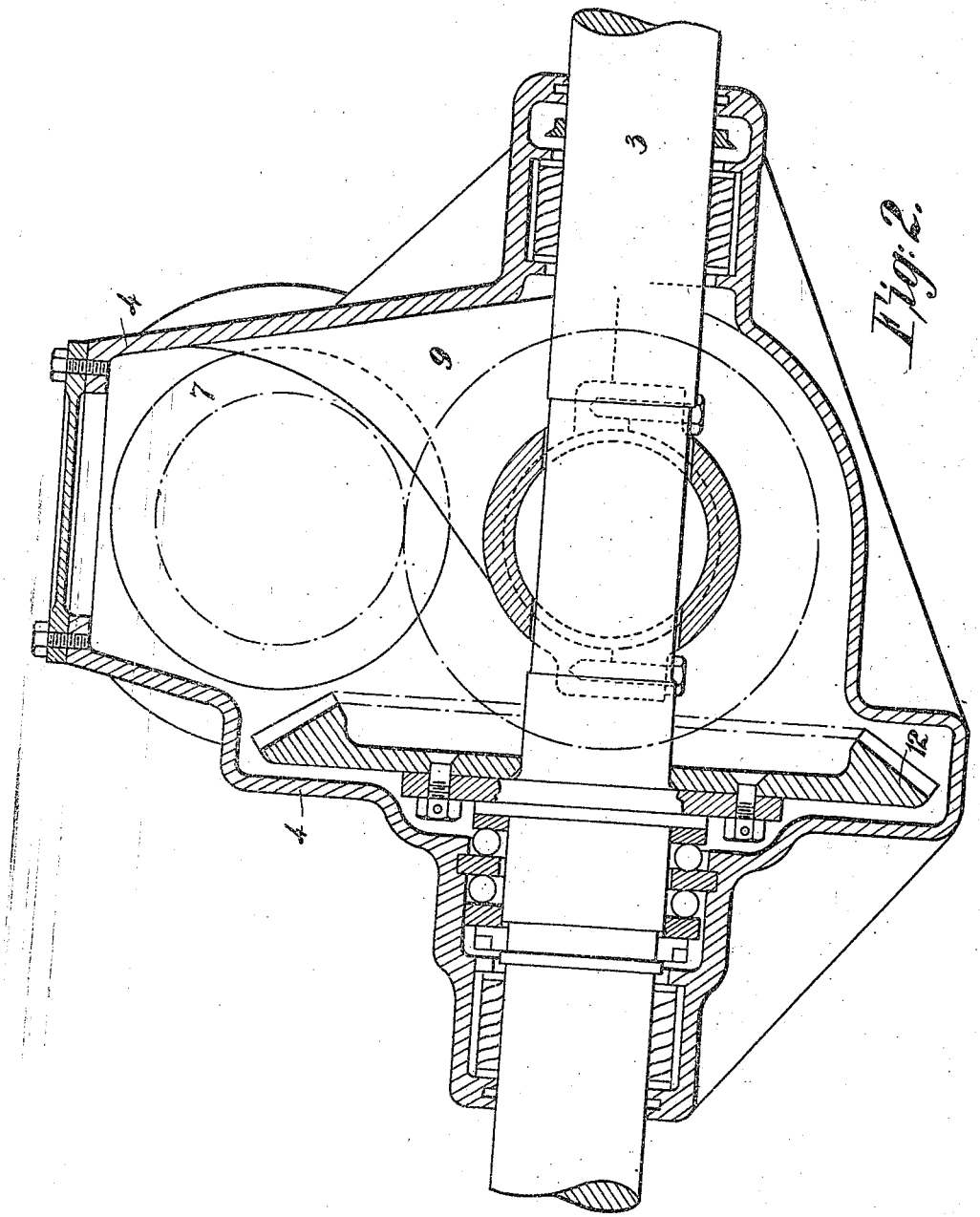

JOHN GODFREY PARRY THOMAS, OF CHISWICK, LONDON, ENGLAND, ASSIGNOR TO THOMAS FOREIGN PATENTS LIMITED, OF LONDON, ENGLAND, A CORPORATION OF GREAT BRITAIN.

GEARING.

1,203,662.  Specification of Letters Patent.  Patented Nov. 7, 1916.

Application filed June 28, 1913. Serial No. 776,345.

*To all whom it may concern:*

Be it known that I, JOHN GODFREY PARRY THOMAS, a subject of the King of Great Britain, residing at 21 Ennismore avenue, Chiswick, in the county of London, England, have invented new and useful Improvements in Gearing, of which the following is a specification.

This invention relates to an improved arrangement of gearing for transmitting power from a prime motor through suitable Cardan shafts and through differential and reduction gearing to two axles of a vehicle, in order that the adhesion of two sets of wheels may be utilized for propulsion without excessive wear occurring when from any cause one set of wheels has to rotate at a slightly different speed from the other.

According to the invention the differential gearing and the desired reduction gearing are mounted in a casing arranged about one of the driven axles. The side members of the differential gearing, which is arranged above or below the axle, drive through spur pinions and spur wheels to shafts on a level with the axle but at right angles to it. One of these is connected with the axle through bevel gearing, while the other extends outside the casing and through suitable universal couplings and a second similar bevel gearing transmits the drive to the second axle. If desired the bevel gearing may also be reduction gearing, so that the vehicle may exert a large tractive effort.

The accompanying drawings illustrate the construction in which the invention is embodied in a bogie, both axles of which are to be driven.

Figure 1 is a longitudinal section of the structure, and Fig. 2 is a transverse section, on the line II—II of Fig. 1.

In these drawings, 1 is a shaft driven through suitable universal couplings 1ª, 1ᵇ from the prime motor, and this shaft carries a central member 2 of a differential gearing supported centrally above one axle, say the outer axle 3 of the bogie in a casing 4 which surrounds that axle. The side members 5 and 6 of the differential gearing are connected respectively with spur pinions 7 and 8 which mesh with spur wheels 9 and 10 arranged on short shafts 14, 10ª parallel to the shaft 1 but at the level of the axle 3. Each of these shafts is supported at its inner and outer end in ball bearings 22, 23, 24, 25 as indicated. The shaft 1 is similarly mounted and in addition has thrust bearings 26 at either end to prevent longitudinal movement. The spur wheel 10 through its shaft 10ª drives a bevel pinion 11 meshing with a bevel wheel 12 secured on the axle 3 of the vehicle, which carries the road or rail wheels 13. A thrust bearing 27 is interposed between this bevel wheel 11 and the gear casing 4 to take up end pressure. The shaft 14 of pinion 9 extends through the gear casing 4 and is driven through universal coupling 15, an ordinary Cardan shaft 15ª having the universal joint 16 at its other end. This joint is also secured to a shaft 17 somewhat similar to shaft 14. Shaft 17 drives the second or inner axle 18 of the bogie through bevel gears 19, 20. The track wheels 21 are carried by axle 18.

It will be noted that both the spur gears and the bevel gears may form reduction gearing if desired.

Alternatively the driving shaft may be brought beneath the inner axle of the bogie to operate a differential gearing arranged below the outer axle instead of above as in the construction illustrated. These and like modifications do not interfere with the operation or advantages of the invention.

What I claim is:

1. In a vehicle having two driven axles, the combination with one of said axles of a casing, a driving shaft therein at right angles to said axle, a balance gearing having its central member connected to said shaft, spur pinions attached to the side members of said balance gearing, shafts on a level with but at right angles to the vehicle axle, spur wheels on said shafts meshing with said spur pinions respectively, and means for connecting said shafts with the vehicle axles.

2. In a vehicle having two driven axles, the combination with one axle of a casing thereupon, a driving shaft having bearings in said casing, a balance gearing having its center member secured to said shaft two further shafts in said casing each in driving connection with one of said axles, and gearing within said casing interconnecting the side members of said balance gearing with the shafts in driving connection with the respective vehicle axles.

3. In a vehicle having two driven axles, the combination with one axle of a casing, a driving shaft mounted therein, balance gearing having its center member secured to said shaft, spur pinions attached to the side members of said balance gearing, shafts on a level with but at right angles to the vehicle axle mounted in said casing, spur wheels on said shafts meshing with said spur pinions, a bevel wheel on one of said shafts, and a bevel wheel on the vehicle axle meshing therewith.

4. In a vehicle having two driven axles, the combination with one axle of a casing mounted thereupon, a driving shaft mounted in said casing, a balance gearing having its center member attached to said shaft, and reduction gearing included in said casing connecting the side members of said balance gearing with the vehicle axles.

5. In a vehicle having two driven axles, the combination with one of said axles of a casing, a driving shaft therein at right angles to said axle, a balance gearing having its central member connected to said shaft, spur pinions attached to the side members of said balance gearing, shafts on a level with but at right angles to the vehicle axle, spur wheels on said shafts, of greater diameter than said spur pinions, meshing with said spur pinions respectively, and means connecting said shafts with the vehicle axles.

6. In a vehicle having two driven axles the combination with one of said axles o a casing, a driving shaft therein at right angles to said axle, a balance gearing having its central member connected to said shaft, spur pinions attached to the side members of said balance gearing, shafts on a level with but at right angles to the vehicle axle, spur wheels on said shafts meshing with said spur pinions respectively and reduction gearing in said casing connecting said shafts with the vehicle axles.

In testimony whereof I have signed my name to this specification in the presence of two subscribing witnesses.

JOHN GODFREY PARRY THOMAS.

Witnesses:
A. E. ODELL,
LEONARD E. HAYNES.